United States Patent [19]
Itzkovich et al.

[11] Patent Number: 5,982,480
[45] Date of Patent: Nov. 9, 1999

[54] METHOD FOR DETERMINING THE POSITION OF TARGETS IN THREE DIMENSIONAL SPACE BY OPTICAL CHIRPED RADIO FREQUENCY MODULATION

[75] Inventors: Moti Itzkovich, Petach-Tikva; Netzer Moriya, Ramat Hasharon, both of Israel

[73] Assignee: Netmor Ltd., Ramat Hasharon, Israel

[21] Appl. No.: 09/072,449

[22] Filed: May 5, 1998

[30] Foreign Application Priority Data

May 8, 1997 [IL] Israel ......................................... 120806

[51] Int. Cl.$^6$ .............................. G01B 11/26; G01C 3/08
[52] U.S. Cl. .................. 356/141.1; 356/4.01; 356/141.5; 702/152
[58] Field of Search ................................ 356/141.1, 4.01, 356/141.5; 702/152

[56] References Cited

U.S. PATENT DOCUMENTS 3,866,229  2/1975  Hammack .
4,727,374  2/1988  Boulais .
5,294,970  3/1994  Dornbusch et al. .

OTHER PUBLICATIONS

Ifftimia, N., et al., "Active Remote Sensing Heterodyne Technique," SPIE vol. 2120, pp. 354–357; 1995.

Yang Z., et al., Heterodyne Interferometry With A Duel Mode He–Ne Laser for Absolute Distance Interferometry SPIE vol. 2544, pp. 34–357; 1995.

Primary Examiner—Stephen C. Buczinski
Attorney, Agent, or Firm—Browdy and Neimark

[57] ABSTRACT

A method for the real time determination of the three dimensional position of a movable target with respect to a fixed coordinate system, the method utilizing a responder mounted on the target, at least one primary transmitter/receiver of known position and a plurality of secondary transmitter/receivers of known positions.

45 Claims, 10 Drawing Sheets

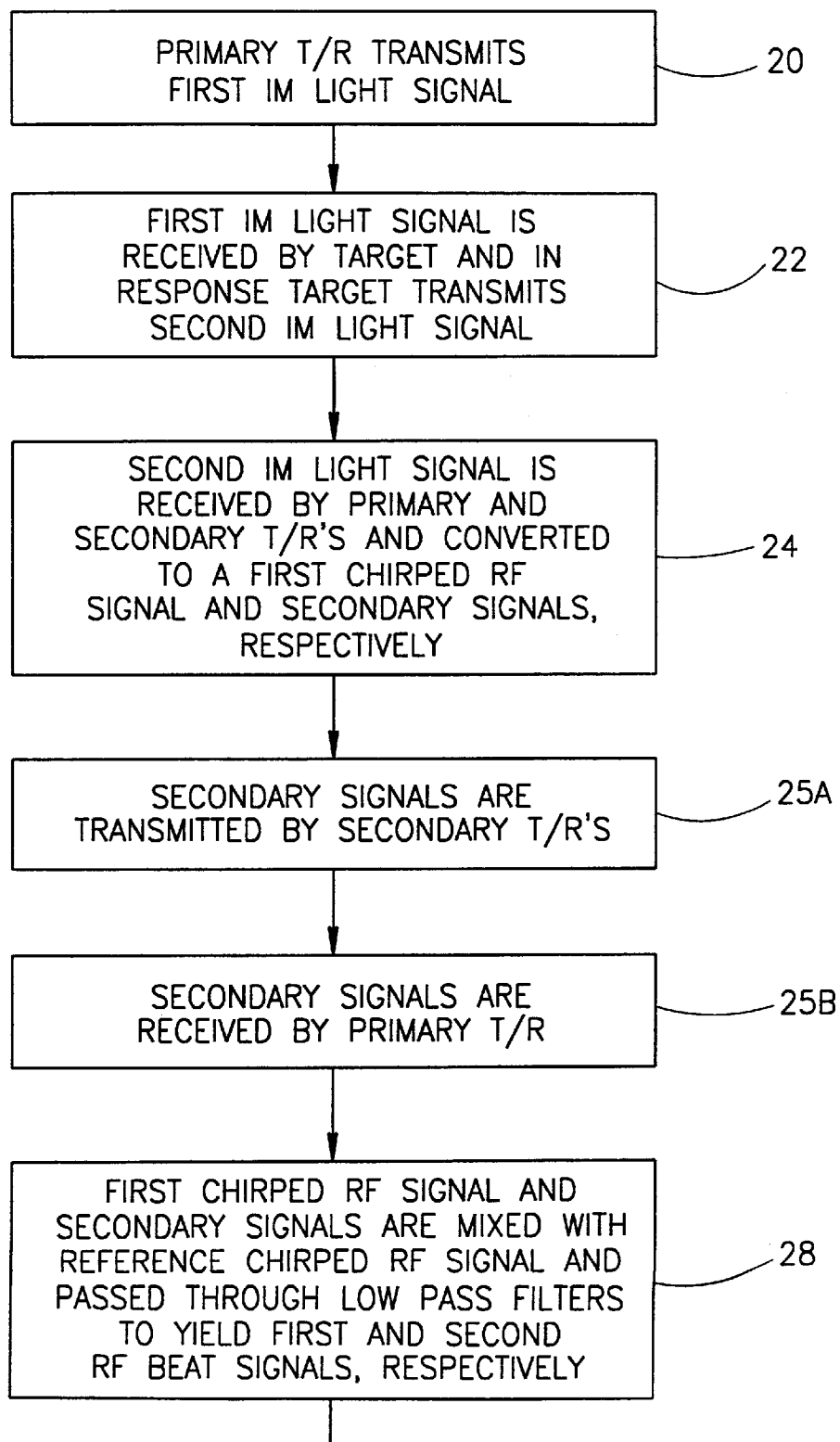
FIG.2A/1

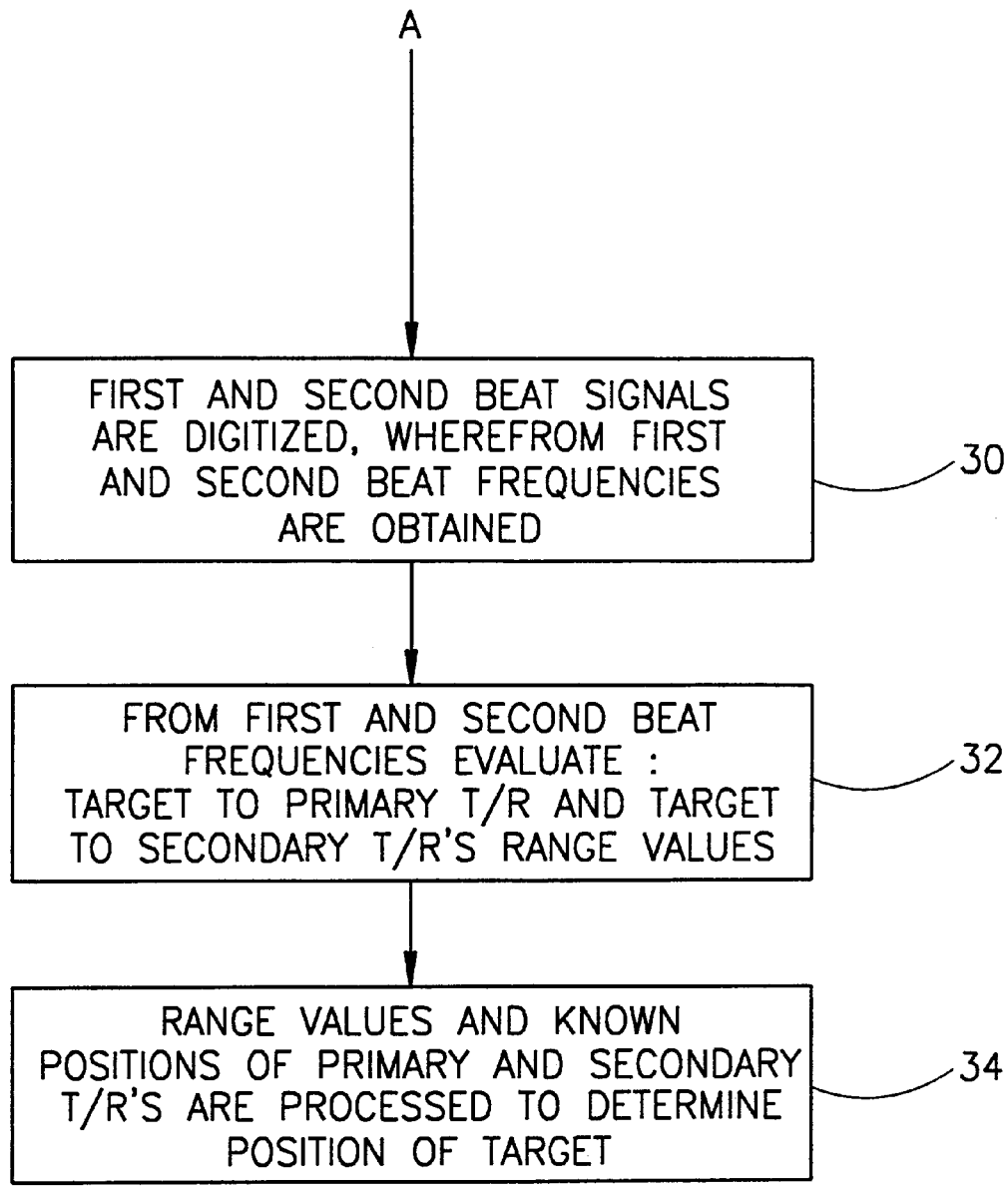
FIG.2A /2

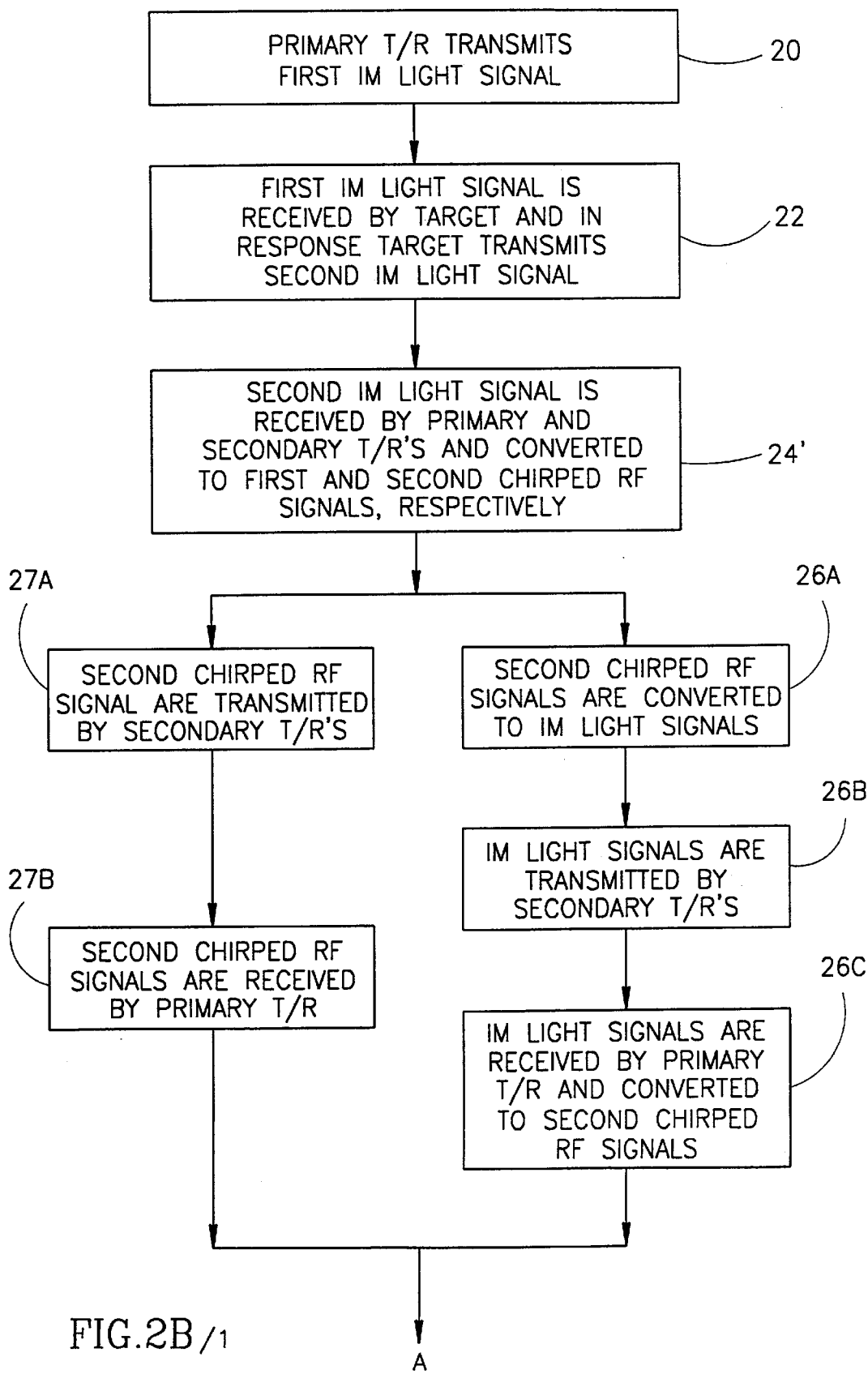
FIG.2B/1

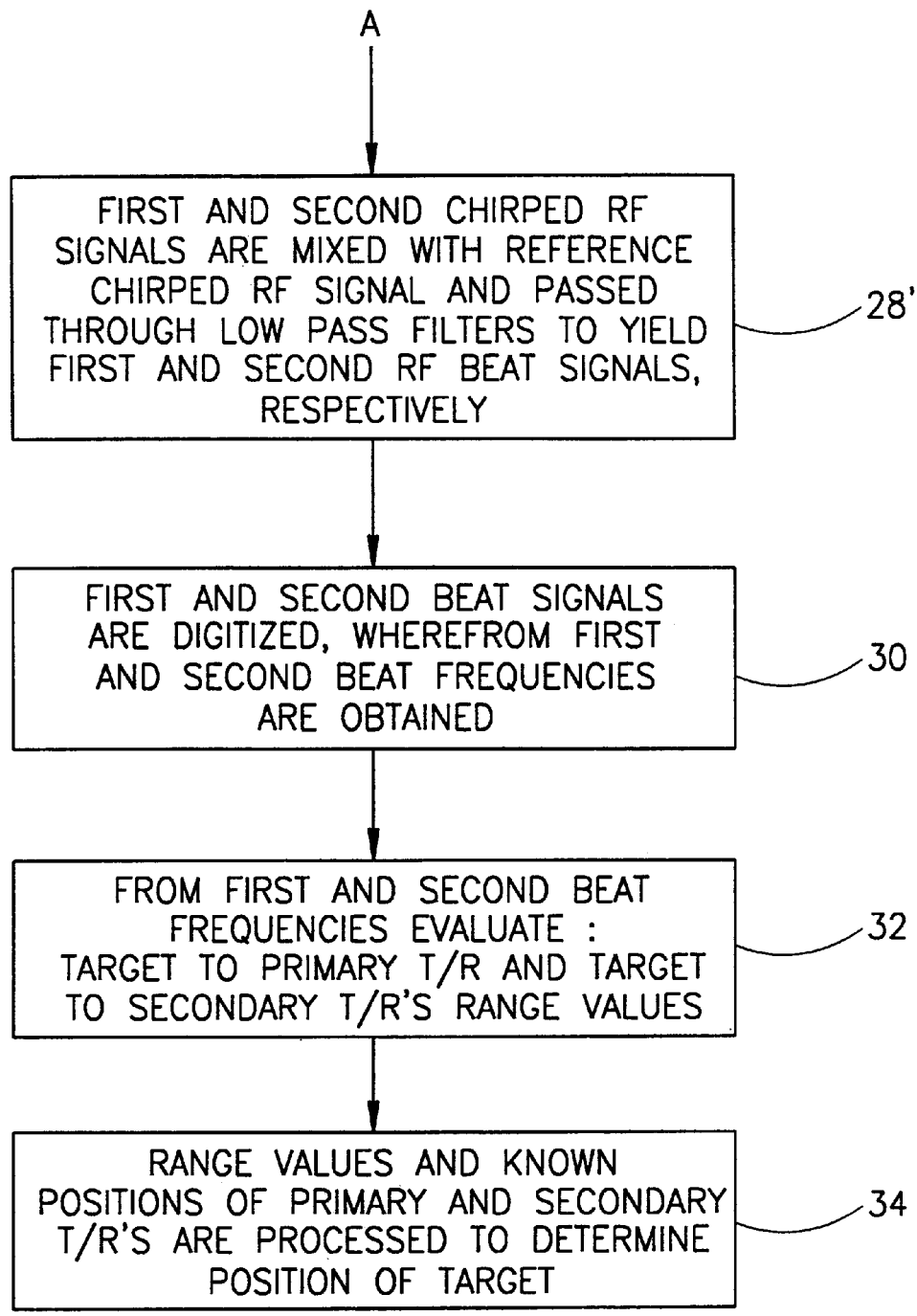
FIG.2B/2

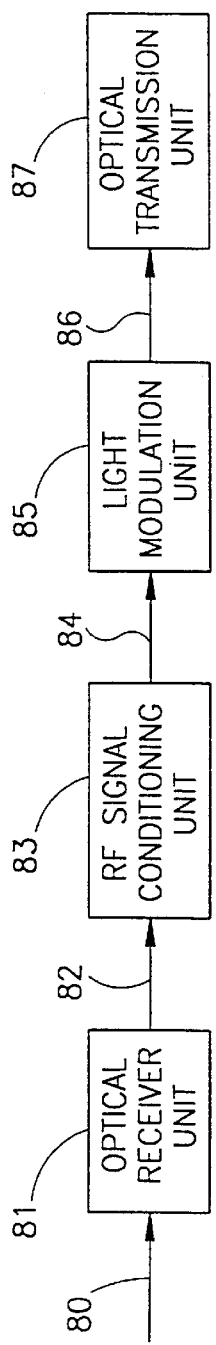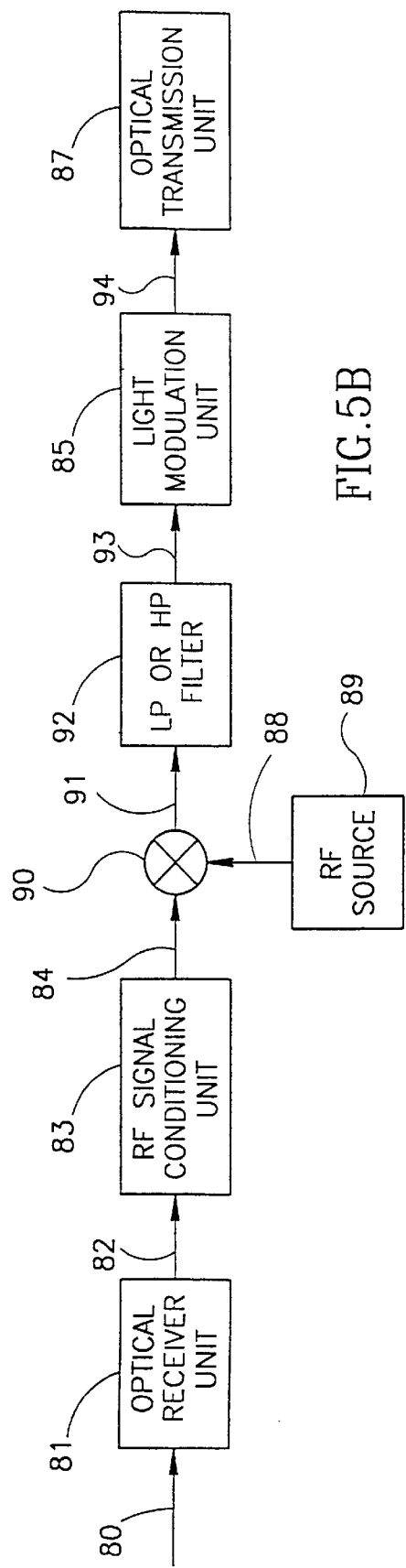
FIG.5A
FIG.5B

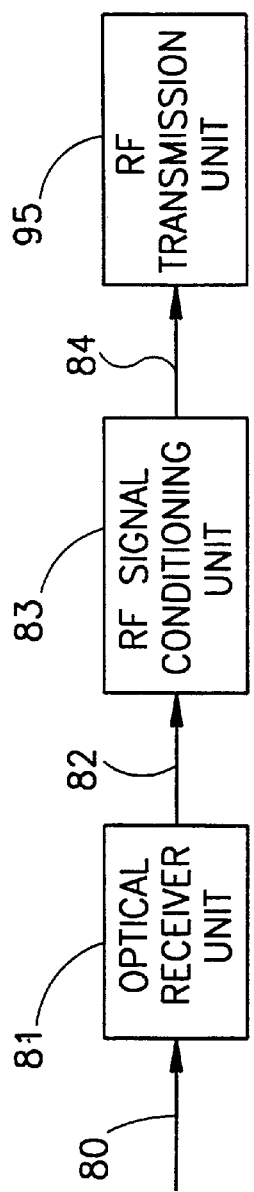
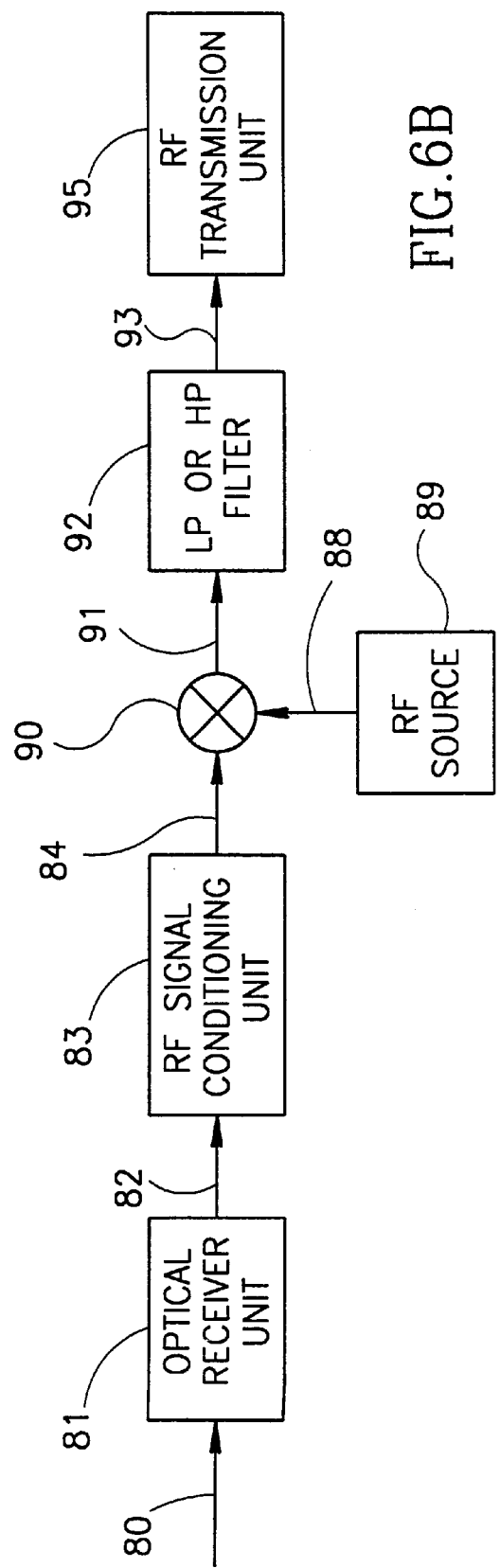

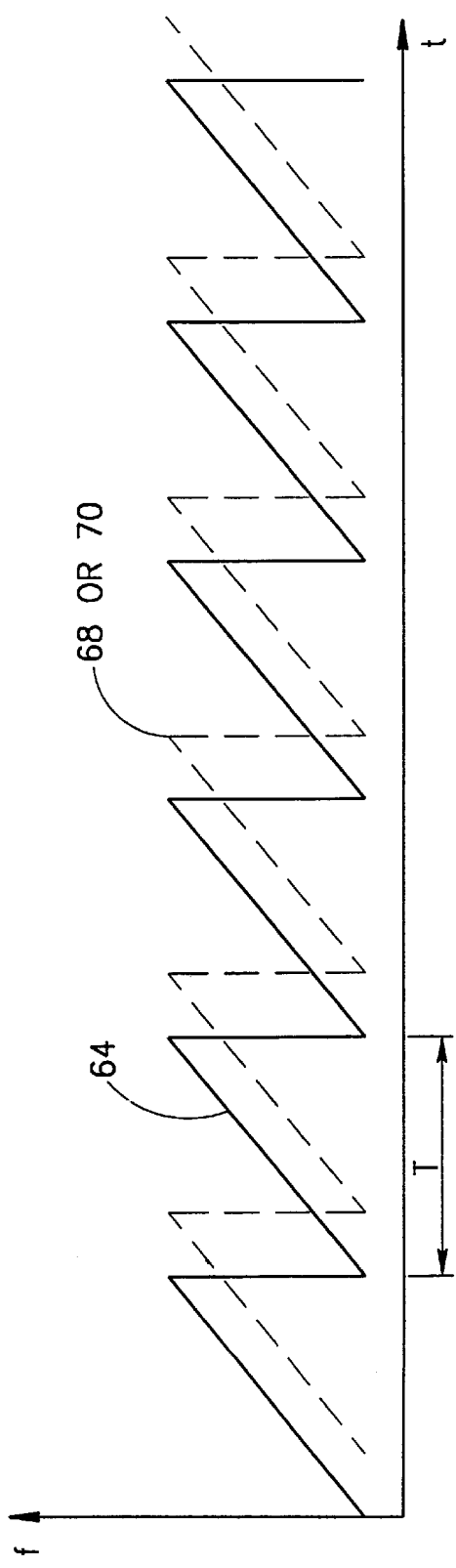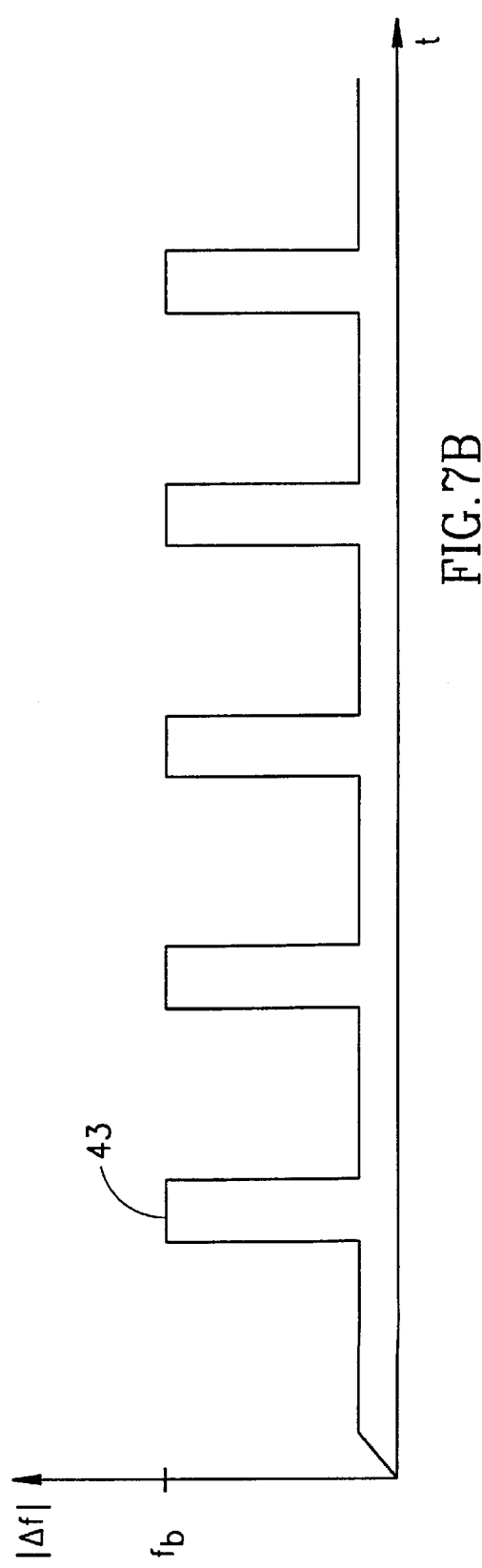

METHOD FOR DETERMINING THE POSITION OF TARGETS IN THREE DIMENSIONAL SPACE BY OPTICAL CHIRPED RADIO FREQUENCY MODULATION

FIELD OF THE INVENTION

The present invention relates to position determination of movable targets in three dimensional space.

BACKGROUND OF THE INVENTION

Position determination of a movable target in three dimensional space is may be based upon range and/or angle determinations from which the coordinates of the target are determined. In radar based methods radio frequency pulsed radiation is used. The range of the target is determined by noting the round trip time of a pulse from the moment it leaves the radar system until it returns after having reflected of the target. The range is given by the product of half the round trip time times the velocity of light. The shorter the wavelength used the greater the precision of the estimated range of the target from the radar system.

Among the optical methods range estimation using light in free space (i.e., excluding waveguide technologies), the Time Of Flight (TOF) and the interferometry or heterodyne detection methods (see, e.g., Ifftimia N., Kopica M. and Spanulescu I. "Active Remote Sensing Heterodyne Technique," SPIE Vol. 2120, pp. 136–142, 1994) are most commonly used The former is the optical equivalent of the radar method and estimates the distance between the light pulse transmitter/receiver and the target by measuring the round trip time required for a light pulse to travel between the transmitter/receiver and the target. Alternatively if the transmitter and receiver are at different locations the time of flight of the light pulse from the transmitter to the receiver via the target is measured.

The heterodyne detection method uses a coherent light in an interferometer configuration and is generally more accurate than the more straightforward TOF method which is useful for measuring distances from several meters to a few kilometers. For the measurement of distances from few a millimeters to several meters interferometers using a coherent light source can be used. The interferometric method has a drawback in that there is an inherent ambiguity in counting integer fringes. The heterodyne detection method is based on the absolute distance interferometry method in which a synthetic long wavelength is produced by using two wavelengths with a small wavelength difference between them (see, e.g., Yang Z., Ting Z. and Weiming R. "Heterodyne Interferometer with a Dual Mode He-Ne Laser for Absolute Distance Interferometry," SPIE Vol. 2544, pp. 354–357, 1995).

It is an object of the present invention to provide a method for accurate real three dimensional time position determination of a movable target that does not suffer from estimation ambiguities.

SUMMARY OF THE INVENTION

In accordance with the present invention there is provided a method for the real time determination of the three dimensional position of a movable target with respect to a fixed coordinate system, the method utilizing a responder mounted on the target, at least one primary—transmitter/receiver of known position and a plurality of secondary transmitter/receivers of known positions, said method comprising the steps of:

(a) transmitting a first intensity modulated light signal from said at least one primary transmitter/receiver;

(b) receiving said transmitted first intensity modulated light signal by said responder;

(c) transmitting from said responder a second intensity modulated light signal in response to said received first intensity modulated light signal;

(d) receiving said transmitted second intensity modulated light signal by said at least one primary transmitter/receiver and by said plurality of secondary transmitter/receivers;

(e) converting in said at least one primary transmitter/receiver the second intensity modulated light signal received by said at least one primary transmitter/receiver into a first chirped radio frequency signal;

(f) converting in each secondary transmitter/receiver of said plurality of secondary transmitter/receivers the received second intensity modulated light signal into a secondary signal whereby a plurality of secondary signals is obtained;

(g) transmitting said plurality of secondary signals from said plurality of secondary transmitter/receivers to said at least one primary transmitter/receiver;

(h) receiving said plurality of secondary signals by said at least one primary transmitter/receiver;

(i) mixing said first chirped radio frequency signal and each one of said plurality of secondary signals with said reference chirped radio frequency signal to obtain mixed first signals and a plurality of mixed second signals;

(j) filtering high frequency components from said mixed first signals and said plurality of mixed second signals by passing said mixed first signals and said plurality of mixed second signals through a low pass filter to yield a first radio frequency beat signal and a plurality of second radio frequency beat signals, respectively;

(k) digitizing said first radio frequency beat signal and said plurality of second radio frequency beat signals and obtaining therefrom first beat frequencies and a plurality of second beat frequencies;

(l) utilizing said obtained first beat frequency to evaluate a first range value from the responder to the primary transmitter/receiver and utilizing said obtained plurality of second beat frequencies to evaluate second range values from the responder to each secondary transmitter/receiver of said plurality of secondary transmitter/receivers; and (m) processing said known position of said at least one primary—transmitter/receiver, said known positions of said plurality of secondary transmitter/receivers, said first range value and said second range values to determine the position of the movable target with respect to said fixed coordinate system.

By one embodiment, said secondary signals are second chirped radio frequency signals.

By another embodiment, said secondary signals are second chirped radio frequency signals and steps (g) and (h), stipulated above, are replaced by the following steps:

(i) converting said second chirped radio frequency signals in said secondary transmitter/receivers of said plurality of second transmitter/receivers into intensity modulated light signals, whereby a plurality of intensity modulated light signals is obtained;

(ii) transmitting said intensity modulated light signals from said plurality of secondary transmitter/receivers; and (iii) receiving said intensity modulated light signals by said primary transmitter/receiver and converting said received intensity modulated light signals into second chirped radio frequency signals, whereby a plurality of second chirped radio frequency signals is obtained.

By yet a further embodiment, said secondary signals are second chirped radio frequency signals and steps (g) and (h), stipulated above, are replaced, for at least one secondary transmitter/receiver of said plurality of secondary transmitter/receivers by the following steps:

(i) converting said second chirped radio frequency signals in said secondary transmitter/receivers of said plurality of second transmitter/receivers into intensity modulated light signals, whereby a plurality of intensity modulated light signals is obtained;

(ii) transmitting said intensity modulated light signals from said plurality of secondary transmitter/receivers; and (iii) receiving said intensity modulated light signals by said primary transmitter/receiver and converting said received intensity modulated light signals into second chirped radio frequency signals, whereby a plurality of second chirped radio frequency signals is obtained.

In accordance with one specific application, said plurality of secondary transmitter/receivers comprises three secondary transmitter/receivers.

Preferably, said three secondary transmitter/receivers are grouped into two secondary transmitter/receivers that form a plane with said at least one primary transmitter/receiver and a third secondary transmitter/receiver not included in said plane.

In accordance with another specific application, said plurality of secondary transmitter/receivers comprises two secondary transmitter/receivers and said primary transmitter/receiver and said two secondary transmitter/receivers are located in the XY-plane of said fixed coordinate system and the Z coordinate of said movable target does not take on negative values.

In accordance with yet another specific application, said plurality of secondary transmitter/receivers comprises two secondary transmitter/receivers and said primary transmitter/receiver and said two secondary transmitter/receivers are located in the XY-plane of said fixed coordinate system and the Z coordinate of said movable target does not take on positive values.

Preferably, each second chirped radio frequency signal of said plurality of second chirped radio frequency signals is transmitted from each secondary transmitter/receiver to said at least one primary transmitter/receiver by means of a radio frequency transmission unit.

If desired, said radio frequency transmission unit is a radio frequency transmitter connected to an antenna and said second chirped radio frequency signals are transmitted in free space.

Alternatively, said radio frequency transmission unit is a radio frequency transmitter connected to a coaxial cable through which said second chirped radio frequency signals are transmitted.

Optionally, at least one secondary transmitter/receiver of said plurality of transmitter\receivers transmits said second chirped radio frequency signal to said at least one primary transmitter/receiver in free space by means of an antenna and the remaining secondary transmitter/receivers transmits said second chirped radio frequency signal to said at least one primary transmitter/receiver by means of a coaxial cable.

Preferably, each intensity modulated light signal of said plurality of intensity modulated light signals is transmitted from each secondary transmitter/receiver to said at least one primary transmitter/receiver by means of an optical transmission unit.

If desired, said optical transmission unit is a lens arrangement and said intensity modulated light signals are transmitted in free space.

Alternatively, said optical transmission unit is provided with a fiber optical cable through which said intensity modulated signals are transmitted.

Optionally, at least one secondary transmitter/receiver of said plurality of transmitter\receivers transmits said intensity modulated light signals to said at least one primary transmitter/receiver in free space by means of a lens arrangement and the remaining secondary transmitter/receivers transmit said intensity modulated light signals to said at least one primary transmitter/receiver by means of a fiber optical cable.

In accordance with the present invention, said first range value, $r^{(1)}$, is obtained by solving the following equation for the first beat frequency, $F^{(1)}$,:

$$F^{(1)} = 2\frac{B}{T}\frac{r^{(1)}}{C},$$

where:
B is the chirp bandwidth,
T is the chirp duration,
C is the speed of light.

Also in accordance with the present invention, said second range values, $r_i^{(2)}$, are obtained by solving the following equations for the second beat frequencies, $F_i^{(2)}$,:

$$F_i^{(2)} = 2\frac{B}{T}\left(\frac{r^{(1)}}{C} + \frac{r_i^{(2)}}{C} + \tau_i\right),$$

where:
where $\tau_i$ is the known time delay of a signal propagating from the $i^{th}$ secondary transmitter/receiver to the primary transmitter/receiver,
i=1, . . . , N where N is the number of secondary transmitter/receivers
B is the chirp bandwidth,
T is the chirp duration,
C is the speed of light.

Generally, said position of the movable target with respect to said fixed coordinate system is obtained by solving four quadratic equations for the three unknown coordinates of movable target.

Typically, said four quadratic equations are as follows:

$$(x_2-x_1)^2+(y_2-y_1)^2+(z_2-z_1)^2=(r^{(1)})^2$$

$$(x_2-x_i)^2+(y_2-y_i)^2+(z_2-z_i)^2=(r_i^{(1)})^2 \ (i=3,4,5),$$

where
$x_1,y_1,z_1$ are the coordinates of the primary transmitter/receiver,
$x_i,y_i,z_i$ (i=3,4,5) are the coordinates of the three secondary transmitter/receivers 3, 4 and 5, respectively,
$x_2,y_2,z_2$ are the coordinates of the target,
$r^{(1)}$ is the distance between the target and the primary transmitter/receiver (first range value) and
$r_i^{(2)}$ (i=3,4,5) are the distances between the target and the three secondary transmitter/receivers 3, 4 and 5, respectively (second range values).

In accordance with one specific embodiment, two of the secondary transmitter/receivers and said primary transmitter/receiver are located in the XY-plane of the coordinate system and the target is confined to move solely in the upper half space (i.e., $z_2>0$).

In accordance with another specific embodiment, two of the secondary transmitter/receivers and said primary transmitter/receiver are located in the XY-plane of the coordinate system and the target is confined to move solely in the lower half space (i.e., $z_2<0$).

In accordance with the present invention there is also provided a system for the real time determination of the position, with respect to a fixed coordinate system, of a movable target provided with a responder, said system comprising:

a primary transmitter/receiver of known position for transmitting a first intensity modulated light signal, for receiving a second intensity modulated light signal, for converting said second intensity modulated light signal into a first chirped radio frequency signal, for receiving secondary signals and for mixing said first chirped radio frequency signal and said secondary signals with a reference chirped radio frequency signal, whereby mixed signals are obtained;

a responder mounted on said target for receiving said transmitted first intensity modulated signal, for generating said second intensity modulated light signal in response to said received first intensity modulated light signal and for transmitting said second intensity modulated light signal;

a plurality of secondary transmitter/receivers of known positions for receiving said transmitted second intensity modulated light signal, for converting the received second intensity modulated light signal into a secondary signals and for transmitting said secondary signals;

low pass filters for filtering high frequency components from said mixed signals whereby first and second radio frequency beat signals are obtained;

analog-to-digital converters for digitizing said first and second radio frequency beat signals;

a processor for obtaining from said digitized first and second radio frequency beat signals, a first beat frequency and second beat frequencies, respectively, and for determining the position of the movable target with respect to said fixed coordinate system.

In accordance with a preferred embodiment said primary transmitter/receiver comprises:

a radio frequency chirp source for producing a chirped radio frequency signal;

a first radio frequency power splitter for splitting said chirped radio frequency signal into a reference chirped radio frequency signal and a modulating chirped radio frequency signal;

a second radio frequency power splitter for splitting said reference chirped radio frequency signal into a plurality of reference chirped radio frequency signals;

a light modulation unit to be modulated by said modulating chirped radio frequency signals to produce a first intensity modulated light signal;

a detector for detecting said second intensity modulated light signal and for converting said detected second intensity modulated light into a first chirped radio frequency signal;

receiver units for receiving said secondary signals; and a plurality of mixers for mixing said first chirped radio frequency signal and said secondary signals with said plurality of reference chirped radio frequency signals, whereby said mixed signals are obtained.

In accordance with one embodiment, said receiver units are radio frequency receivers and the secondary signals are second chirped radio frequency signals transmitted in coaxial cables.

In accordance with another embodiment, said receiver units are radio frequency receivers provided with antennas and said secondary signals are second chirped radio frequency signals transmitted in free space.

In accordance with a further embodiment, said receiver units are amplifiers and detectors provided with fiber optical cables and said secondary signals are intensity modulated light signals transmitted in fiber optical cables.

In accordance with yet a further embodiment, said receiver units are amplifiers and detectors and said secondary signals are intensity modulated light signals transmitted in free space.

By one specific application, said plurality of secondary transmitter/receivers comprises three secondary transmitter/receivers.

Preferably, said three secondary transmitter/receivers are grouped into two secondary transmitter/receivers that form a plane with said at least one primary transmitter/receiver and a third secondary transmitter/receiver not included in said plane.

In accordance with another specific application, said plurality of secondary transmitter/receivers comprises two secondary transmitter/receivers and said primary transmitter/receiver and said two secondary transmitter/receivers are located in the XY-plane of said fixed coordinate system.

By one specific application, a secondary transmitter/receiver of said secondary transmitter/receivers, is constructed to transmit an intensity modulated light signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal;

a light modulation unit for receiving said conditioned radio frequency signal and for transmitting an intensity modulated light signal; and an optical transmission unit for transmitting said intensity modulated light signal from said secondary transmitter/receiver.

By another specific application, a secondary transmitter/receiver of said secondary transmitter/receivers, is constructed to transmit a chirped radio frequency signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal; and a radio frequency transmission unit for transmitting said conditioned chirped radio frequency signal from said secondary transmitter/receiver.

If desired, said secondary transmitter/receiver further comprises:

a radio frequency source for providing a radio frequency signal;

a mixer for mixing said radio frequency signal with said conditioned radio frequency signal, whereby a mixed signal is obtained; and a filter for filtering said mixed signal.

By one application, said filter is a low pass filter.

By another application, said filter is a high pass filter.

BRIEF DESCRIPTION OF THE DRAWINGS

For a better understanding the invention will now be described, by way of example only, with reference to the accompanying drawings and appendix in which:

FIGS. 2A and 2B illustrate the principle steps involved in target position determination in accordance with the invention;

FIG. 5a shows an illustrative block diagram of a typical secondary transmitter/receiver for transmitting an IM light signal;

FIG. 5b shows an illustrative block diagram of a typical secondary transmitter/receiver for transmitting an IM light signal with a frequency shifted chirped RF signal;

FIG. 6a shows an illustrative block diagram of a typical secondary transmitter/receiver for transmitting a chirped RF signal;

FIG. 6b shows an illustrative block diagram of a typical secondary transmitter/receiver for transmitting a frequency shifted chirped RF signal;

FIG. 7a shows a typical reference chirped RF signal and a typical received chirped RF signal; and FIG. 7b shows a typical narrow band signal at the output of the mixers of the primary transmitter/receiver.

DETAILED DESCRIPTION OF THE INVENTION

Figure 1:
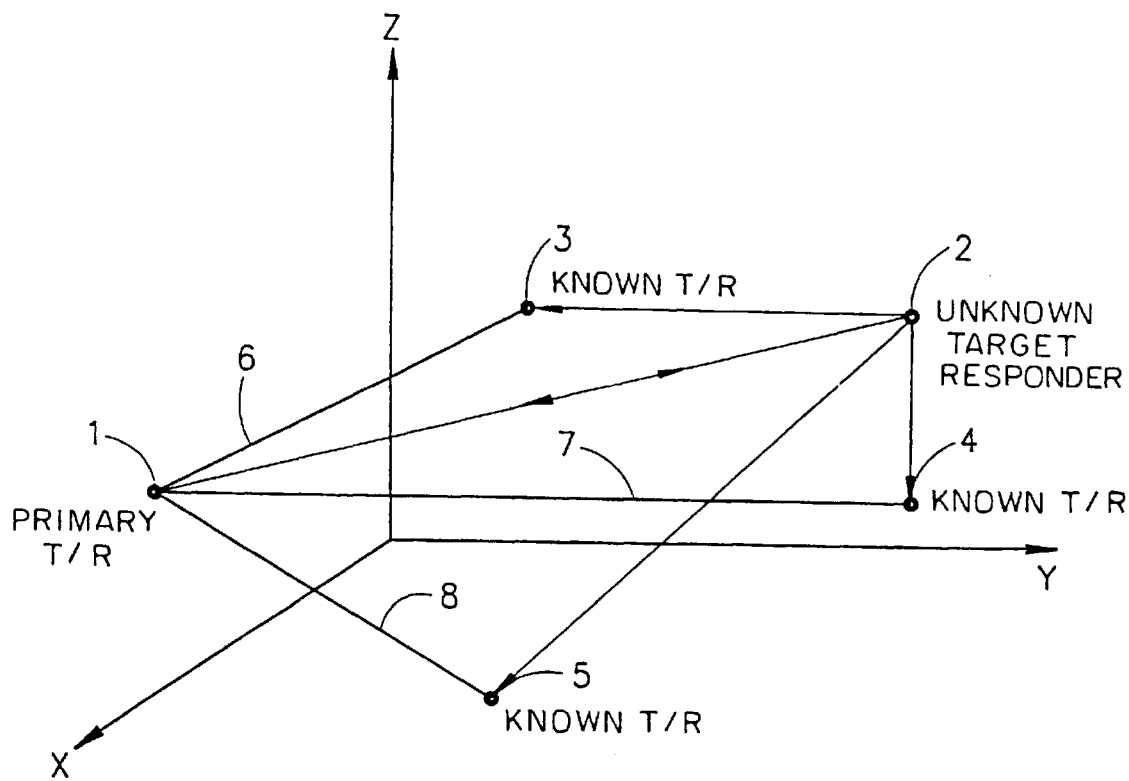
FIG. 1 illustrates the geometrical arrangement of the various units participating in the method of the invention.

Attention is first drawn to FIG. 1 illustrating the geometrical arrangement of the various units participating in the method of the invention. The units are denoted by dots which represent reference points with respect to which the position of the units are referred to. A primary transmitter/receiver 1 is located at a known position $(x_1,y_1,z_1)$ with respect to the given Cartesian coordinate system with axes X,Y and Z. Also shown is the target 2 and three secondary transmitter/receivers 3, 4 and 5. The three secondary transmitter/receivers 3, 4 and 5 are located at known positions $(x_3,y_3,z_3)$, $(x_4,y_4,z_4)$ and $(x_5,y_5,z_5)$, respectively, and the object is to determine the position $(x_2,y_2,z_2)$ of the target 2.

It should be noted that for convenience of illustration the three dimensional positions of the target and the primary and secondary transmitter/receivers have been referred to Cartesian rectangular coordinates. However, this is by no means binding and the positions of the target and the primary and secondary transmitter/receivers could just as well have been referred to any convenient coordinate system. For example a cylindrical coordinates could have been used.

The straight lines 6, 7 and 8 designate "transmission links" between the primary transmitter/receiver 1 and the secondary transmitter/receivers 3, 4 and 5, respectively. The nature of the transmission links depends on the type of signal being transmitted and the method chosen to transfer the signal from the secondary transmitter/receivers 3, 4 and 5 to the primary transmitter/receiver 1. Two types of signals, both of them electromagnetic signals, will be used in the present invention, namely light signals and chirped radio frequency signals.

When the signals are transmitted in free space the straight lines 6, 7 and 8 indicate, respectively, the paths taken by the signals (whether light signals or radio frequency signals) in passing from the secondary transmitter/receivers 3, 4 and 5 to the primary transmitter/receiver 1.

Only three secondary transmitter/receivers have been shown for clarity of illustration. However, the number of secondary transmitter/receivers is by no means bound to three and more than three can be used. Three secondary transmitter/receivers is the minimum number required for target position determination in accordance with the invention. However, in the special case in which two of the secondary transmitter/receivers and said primary transmitter/receiver are located in the XY-plane of the coordinate system and the target is confined to move solely in the upper half space (i.e., $z_2>0$), or solely in the lower half space (i.e., $z_2<0$) then the two secondary transmitter/receivers located in the XY-plane will suffice for target position determination.

In FIG. 1 only one primary transmitter/receiver of known position has been shown, however, any number of primary transmitter/receivers, each of known position, could be used. Although not necessary, further primary transmitter/receivers could be placed at essentially the same location as that shown in FIG. 1. The number of primary and secondary transmitter/receivers used depends on the required spatial coverage.

As will be described below in greater detail, the method for the determination of the position of a target utilizes a responder mounted on the target which transmits a signal in response to a signal received from the primary transmitter/receiver. The signal transmitted by the responder has to be received by the primary transmitter/receiver and at least three secondary transmitter/receivers. The secondary transmitter/receivers then transmit signals which are received by the primary transmitter/receiver.

Since the primary and secondary transmitter/receivers have limited fields of view (in the receiving mode) and limited fields of transmission (in the transmission mode), which are not necessarily equal in value, the coverage of the system is limited to the spatial region in which the target is in the field of transmission of the primary transmitter/receiver and vice versa. At the same time, the primary and secondary transmitter/receivers have to be in the field of transmission of the responder and for the case of free space transmission by the secondary transmitter/receivers the primary transmitter/receiver has to be in the angular field of transmission of the secondary transmitter/receivers. Hence, in general, the coverage of the system can be increased by increasing the number of primary and secondary transmitter/receivers.

The principle steps involved in target position determination in accordance with the invention are illustrated in FIGS. 2A and 2B. For the sake of clarity of the description a single primary transmitter/receiver along with three secondary transmitter/receivers, as illustrated in FIG. 1, will be considered. Preferably, two of the secondary transmitter/receivers form a plane with the primary transmitter/receiver, whereas the third secondary transmitter/receiver is positioned outside the plane.

Referring first to FIG. 2A, at step 20 primary Transmitter/receiver 1 transmits a first intensity modulated (IM) light signal which is obtained by modulating a light source with a reference chirped radio frequency (RF) signal from a radio frequency chirp source. The first IM light signal is received by a responder mounted on target 2.

At step 22 the responder detects and amplifies the received signal. The amplified signal modulates a light source thus generating a second IM light signal which is transmitted by the responder.

At step 24 the transmitted second IM light signal is received by primary transmitter/receiver 1 and secondary transmitter/receivers 3, 4, and 5. The second IM light signal received by primary transmitter/receiver 1 is converted into a first chirped RF signals. The second IM light signal received by secondary transmitter/receivers 3, 4, and 5 is converted into secondary signals.

At step 25A, the secondary signals are transmitted by secondary transmitter/receivers 3, 4, and 5 and at step 25B the secondary signals are received by the primary transmitter/receiver.

At step 28 the first chirped RF signal and the secondary signals received by the primary transmitter/receiver are mixed with the reference chirped RF signal yielding two sets of sum and difference signals. That is, one set is dependent on the sum of the frequencies of the signals received by the primary transmitter/receiver and the reference chirped RF signal whilst the other is dependent on their difference. The set dependent on the sum of the frequencies is removed using a low pass filter. The remaining set is characterized by beat frequencies that are a consequence of the time shift formed between the reference chirped RF signal in the primary transmitter/receiver and the signals transmitted and then received back at the primary transmitter/receiver, due to the distance travelled by the transmitted signals until they are received back at the primary transmitter/receiver. After having passed through the low pass filters, the filtered signals will be termed first and second beat signals corresponding to the mixing of the reference chirped RF signal with the first chirped RF signals and the secondary signals, respectively.

At step 30, the first and second beat signals are digitized by passing them through analogue to digital (A/D) converters. The digitized beat signals are then processed by a processor which determines the first beat frequency, $F^{(1)}$, of the first beat signal and the second beat frequencies, $F_i^{(2)}$ (i=1,2,3), of the three second beat signals.

At step 32 the distance between the primary transmitter/receiver 1 and the target 2, or first range value, $r^{(1)}$, is obtained by solving the following equation for the first beat frequency, $F^{(1)}$:

$$F^{(1)} = 2\frac{B}{T}\frac{r^{(1)}}{C},$$

where:

B is the chirp bandwidth,

T is the chirp duration,

C is the speed of light.

Also at step 32, the distances between secondary transmitter/receivers 3,4 and 5 and target 2, or second range values, $r_i^{(2)}$ (i=1,2,3), are obtained by solving the following equations for the second beat frequencies, $F_i^{(2)}$,:

$$F_i^{(2)} = \frac{B}{T}\left(\frac{r^{(1)}}{C} + \frac{r_i^{(2)}}{C} + \tau_i\right),$$

where $\tau_i$ is the known time delay of a signal propagating from the $i^{th}$ secondary transmitter/receiver to the primary transmitter/receiver.

Finally, at step 34 the position of the target, i.e. its coordinates $x_2$, $y_2$ and $z_2$ with respect to the given coordinate system, is evaluated from the known position of the primary and secondary transmitter/receivers and from the first and second range values $r^{(1)}$ and $r_i^{(2)}$ (i=1,2,3).

Attention is now drawn to FIG. 2B, which shows two alternatives for steps 25A and 25B in FIG. 2A. Steps 20 and 22 are identical to those shown in FIG. 2A. Step 24' is different to step 24 of FIG. 2A in that the IM light signals received by the secondary T/R's are converted to second chirped RF signals.

In the next step, secondary transmitter/receivers 3, 4, and 5 transmit a signal, in response to the received second IM light signal, and the transmitted signal is received by the primary transmitter/receiver. The signals transmitted by the secondary transmitter/receivers can be either second chirped radio frequency signals as in step 27A, or IM light signals formed from the second chirped RF signals, as in step 26A. The signals can be transmitted from the secondary transmitter/receivers to the primary transmitter/receiver either in free space or by means other than free space. If IM light signals are transmitted by the secondary transmitter/receivers, as in step 26B, then on reception by the primary transmitter/receiver they are converted back to second chirped RF signals, step 26C. If second chirped RF signals are transmitted then no conversion is necessary when they are received by the primary transmitter/receiver, step 27B.

Step 28' is different to step 28 of FIG. 2A only in that second chirped RF signals instead of secondary signals are mixed with the reference chirped RF signals.

The remaining steps 30, 32 and 34 in FIG. 2B are identical to those shown in FIG. 2A.

When the signals transmitted by the secondary transmitter/receivers are chirped radio frequency signals they can be transmitted in free space or in coaxial cables connecting the secondary transmitter/receivers to the primary transmitter/receiver. Similarly, for IM light signals fiber optical cables can be used for transmitting the signals from the secondary transmitter/receivers to the primary transmitter/receiver.

For free space transmission the signals have to be distinguished from each other. For the free space transmission of light signals this can be achieved either by using optical carrier waves of different carrier wavelengths, or by using different RF chirped signals. For the free space transmission of RF signals this can be achieved by using different RF chirped signals.

The secondary transmitter/receivers are equipped with amplifiers which are tuned so that they cut off signals that are below a certain level. This means that only those signals exceeding a certain signal-to-noise ratio are transmitted by the secondary transmitter/receivers. Since the system requires, in the general case, signals from at least three secondary transmitter/receivers more than three secondary transmitter/receivers should be operative so that should one of them produce a weak signal there will always be at least three signals exceeding the given signal-to-noise ratio for transmitting to the primary transmitter/receiver.

Figure 3:
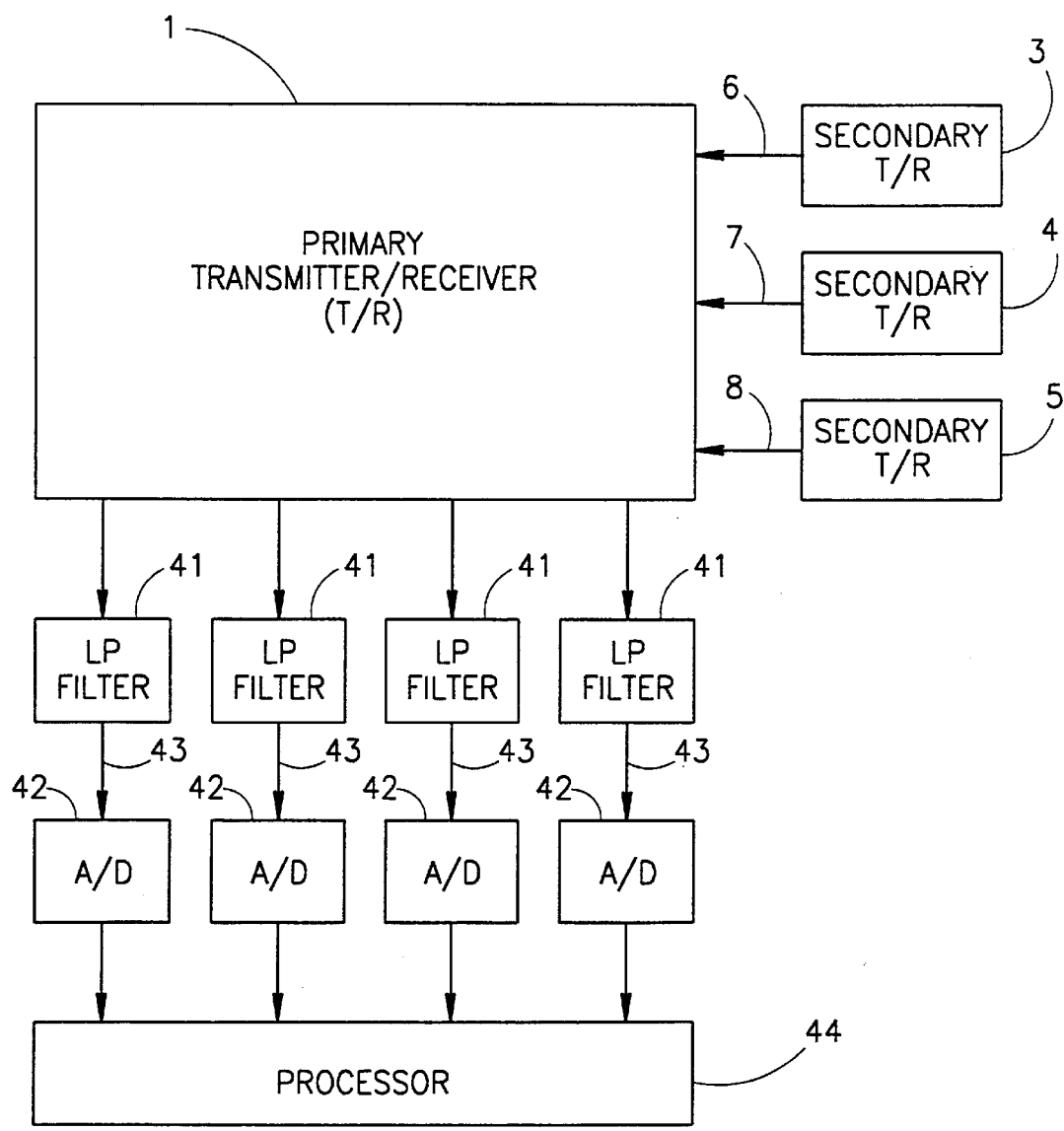
FIG. 3 shows an illustrative block diagram of the system of the invention.

Attention is now drawn to FIG. 3 showing an illustrative block diagram of the system of the invention. Shown is primary transmitter/receiver 1 and the three secondary transmitter/receivers 3, 4 and 5. Also shown are straight lines 6, 7 and 8 designating the "transmission links" between primary transmitter/receiver 1 and secondary transmitter/receivers 3, 4 and 5, respectively. Again, only three secondary transmitter/receivers have been shown for clarity of illustration. However, the number of secondary transmitter/receivers is by no means bound to three and more than three can be used. Primary transmitter/receiver 1 is electrically connected to low pass filters 41 which, in turn, are connected to analog to digital (A/D) converters 42. Only four low pass filters and four A/D converters are shown in the figure since one is required for each secondary transmitter/receiver and one for the signal received from the target (not shown).

The A/D converters are connected to a processor 44 which analyzes the spectrum of the digital beat signals received from the A/D converters. The beat frequencies of the digital beat signals as determined by the processor are then used by it to estimate the position of the target from the known position of the primary and secondary transmitter/receivers and from the first and second range values.

Figure 4:
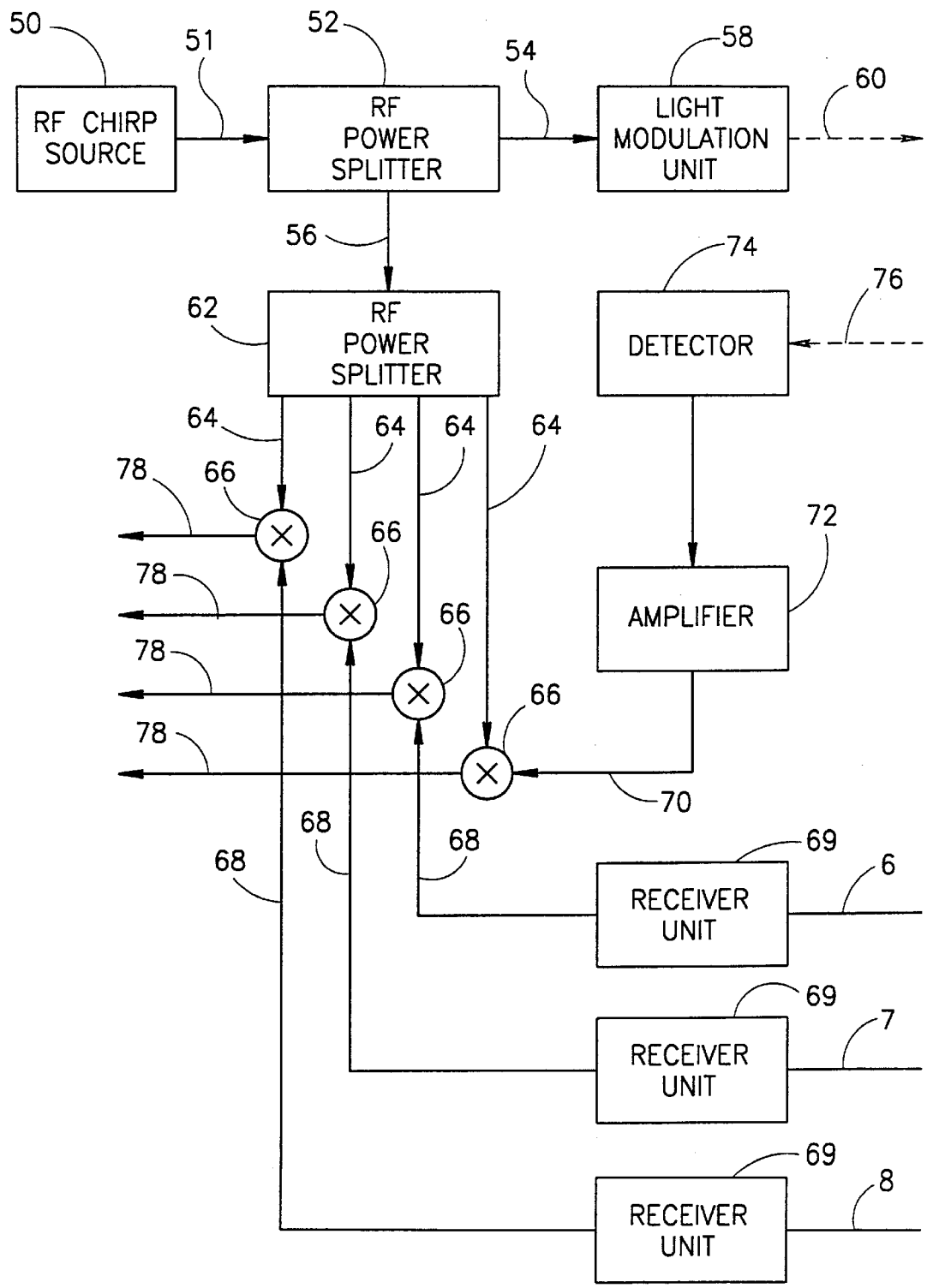
FIG. 4 shows an illustrative block diagram of a primary transmitter/receiver of the invention.

Attention is now drawn to FIG. 4 showing an illustrative block diagram of primary transmitter/receiver 1. Radio frequency chirp source 50 produces a chirped RF signal 51 with a linearly varying frequency over the chirp duration period T. Chirped RF signal 51 is split by RF power splitter 52 into two chirped RF signals 54 and 56. Chirped RF signal 54 is used to modulate a light source in light modulation unit 58 to produce an intensity modulated (IM) light signal 60 having an light carrier frequency with a linearly varying RF modulation.

Chirped RF signal 56 is used as a chirped RF reference signal and is further split by RF power splitter 62 into four chirped RF reference signals 64. Again, for clarity of illustration, only three secondary transmitter/receivers are considered in the system and therefore only four chirped RF reference signals 64 are required. Three chirped RF reference signals are required for mixing, in mixers 66, with the three chirped radio frequency signals 68 (referred to above as second chirped radio frequency signals) received directly, or indirectly, from the three secondary transmitter/receivers.

As described above the nature of the transmission links 6, 7 and 8 depends on the type of signal being transmitted and the method chosen to transfer the signal from the secondary transmitter/receivers to the primary transmitter/receiver. When the second chirped radio frequency signals are received directly by the primary transmitter/receiver, that is, the secondary transmitter/receivers transmit second chirped radio frequency signals then receiver units 69 designate RF receivers provided with coaxial cables, if the signals are transmitted in coaxial cables, or they designate appropriate antennas and RF receivers if the signals are transmitted in free space. If on the other hand the second chirped radio frequency signals are received indirectly by the primary transmitter/receiver, that is, the secondary transmitter/receivers transmit IM light signals then receiver units 69 designate light detectors and amplifiers provided with fiber optical cables, if the signals are transmitted in fiber optical cables, or they designate light detectors and amplifiers if the signals are transmitted in free space.

The fourth chirped RF reference signal is required for mixing with the chirped radio frequency signal 70 (referred to above as a first chirped radio frequency signal) received from amplifier 72 and detector 74. Detector 74 demodulates the IM light signal 76 received from the responder mounted on the target into a chirped RF signal.

The output 78 from mixers 66 consists, as described above, of two sets of sum and difference signals. One set is dependent on the sum of the frequencies of the received chirped RF signals and the reference chirped RF signal and the other is dependent on their difference. The set dependent on the difference of the frequencies have beat frequencies dependent on the relative time shifts of the received chirped RF signals 68 and 70 relative to the reference chirped RF signals 64. The relative time shifts develop in the chirped RF signal 54 relative to the chirped RF signal 56 due to the path difference that develops between them from the moment that the chirped RF signal 54 modulates the light source in light modulation unit 58 to produce an the intensity modulated (IM) light signal 60 and is transmitted from the primary transmitter/receiver until it returns and arrives at the mixers 66 as received chirped RF signals 68 and 70.

Light modulation unit 58 should have three basic properties: (i) it should have a light source with a narrow spectral bandwidth in order that the intensity modulated (IM) light signal 60 be clearly distinguishable from the IM light signal 76 received from the responder, (ii) it should have a wide radiation lobe in order to illuminate a large as possible region of space on the one hand and a correspondingly wide field of view to be able to receive radiation from a large as possible region of space on the other hand, and (iii) it should produce an intensity modulated (IM) light signal with a bandwidth wide enough to ensure that the intensity modulated (IM) light signal will propagate without distortion. Light modulation unit 58 includes not only a light source but also all the optical, electrooptical and other components required to achieve the above three conditions. For example, the radiation lobe of the light source may be naturally wide, or appropriate optics may be used to widen the radiation lobe.

The intensity modulated (IM) light signal 60 can be generated directly or indirectly. Direct generation can be achieved, e.g., by current modulation of a diode-laser or of light emitting diodes. Indirect modulation can be achieved by external modulation by using, for example, electrooptical, acoustooptical or magnetooptical modulators.

The responder should have similar properties to those of light modulation unit 58, That is: (i) it should have a light source with a narrow spectral bandwidth in order that the intensity modulated (IM) light signal 76 be clearly distinguishable from the IM light signal 60 received from the primary transmitter/receiver 1, (ii) it should have a wide radiation lobe in order to illuminate a large as possible region of space in the transmitting mode and a correspondingly wide field of view in order to receive radiation from a large as possible region of space in the receiving mode, and (iii) it should produce an intensity modulated (IM), light signal with a bandwidth wide enough to ensure that the intensity modulated (IM) light signal will propagate without distortion.

Attention is now drawn to FIG. 5a showing an illustrative block diagram of a typical secondary transmitter/receiver which transmits an IM light signal. An IM light signal 80 is incident on an optical receiver unit 81 which includes an optical detector and appropriate optics, the detected chirped RF signal 82 exits optical receiver unit 81 and enters RF signal conditioning unit 83 which performs such operations as amplification and filtering of the chirped RF signal. The conditioned RF signal 84 enters a light modulation unit 85 the result being an IM light signal 86. IM light signal 86 is then transmitted from the secondary transmitter/receiver via optical transmission unit 87 which can be provided with a fibre optical cable for transmission in the fiber optical cable, or which can be a simple lens arrangement, for free space transmission, Attention is now drawn to FIG. 5b showing an illustrative block diagram of a typical secondary transmitter/receiver which transmits an IM light signal with a frequency shifted chirped RF signal. The operation of the secondary transmitter/receiver as shown in FIG. 5b is similar to that of the secondary transmitter/receiver shown in FIG. 5a. The difference between the two being that in FIG. 5b conditioned chirped RF signal 84 is mixed with an RF signal 88 by mixer 90. RF signal 88 is of a given frequency and is provided by an RF source 89. The resultant mixed signal 91 comprises two chirped RF signals shifted in frequency from the conditioned chirped RF signal. One of the two chirped RF signals has all its frequencies increased in value by the value of the frequency of RF signal 88 and the other has all its frequencies decreased in value by the value of the frequency of RF signal 88. Filter 92 can be either a low pass filter or a high pass filter designed to allow only one of the two chirped RF signals comprising the resultant mixed signal 91 to pass. The filtered chirped RF signal 93 then passes through light modulation unit 85 the result being an IM light signal 94 with its modulating chirped RF signal shifted in frequency with respect to that of the IM light signal 86. IM light signal 94 is then transmitted from the secondary transmitter/receiver via optical transmission unit 87 which can be a simple lens arrangement, for free space transmission, or an optical fibre cable for transmission in the fiber optical cable.

Attention is now drawn to FIG. 6a showing an illustrative block diagram of a typical secondary transmitter/receiver which transmits a chirped RF signal. The operation of the secondary transmitter/receiver as shown in FIG. 6a is similar to that of the secondary transmitter/receiver shown in FIG. 5a. The difference between the two being that the conditioned RF signal 84 on exiting RF signal conditioning unit 83 does not enter a light modulation unit but instead enters RF transmission unit 95 which can be provided with a coaxial cable for transmission in the coaxial cable, or which can be an RF transmitter connected to an antenna, for free space transmission.

Attention is now drawn to FIG. 6b showing an illustrative block diagram of a typical secondary transmitter/receiver which transmits an a frequency shifted chirped RF signal. The operation of the secondary transmitter/receiver as shown in FIG. 6b is similar to that of the secondary transmitter/receiver shown in FIG. 5b. The difference between the two being that in FIG. 5b filtered chirped RF signal 93 passes through light modulation unit 85 whereas in FIG. 6b filtered chirped RF signal 93 enters RF transmission unit 95 which can be provided with a coaxial cable for transmission in the coaxial cable, or which can be an RF transmitter connected to an antenna, for free space transmission.

Attention is now drawn to FIG. 7a showing a typical reference chirped RF signal 64 and a typical received chirped RF signal 68 or 70. As can be seen there is a relative time shift between the two signals. FIG. 7b shows the output from a mixer 66 after having passed through low pass filter 41, that is, the beat signals 43 having beat frequencies $f_b$ ($f_b = F^{(1)}$ or $F_i^{(2)}$, i=1,2,3) dependent on the relative time shifts of the received chirped RF signals 68 or 70 relative to the reference chirped RF signals 64.

The present invention has been described and illustrated with a certain degree of particularity. However, it should be understood that various alterations and modifications may be made without departing from the spirit or scope of the invention as hereinafter claimed.

What is claimed is:

1. A method for the real time determination of the three dimensional position of a movable target with respect to a fixed coordinate system, the method utilizing a responder mounted on the target, at least one primary—transmitter/receiver of known position and a plurality of secondary transmitter/receivers connected to said at least one primary transmitter/receiver and at known distances therefrom, said method comprising the steps of:

(a) transmitting a first intensity modulated light signal from said at least one primary transmitter/receiver;
(b) receiving said transmitted first intensity modulated light signal by said responder;
(c) transmitting from said responder a second intensity modulated light signal in response to said received first intensity modulated light signal;
(d) receiving said transmitted second intensity modulated light signal by said at least one primary transmitter/receiver and by said plurality of secondary transmitter/receivers;
(e) converting in said at least one primary transmitter/receiver the second intensity modulated light signal received by said at least one primary—transmitter/receiver into a first chirped radio frequency signal;
(f) converting in each secondary transmitter/receiver of said plurality of secondary transmitter/receivers the received second intensity modulated light signal into a secondary signal whereby a plurality of secondary signals is obtained;
(g) transmitting said plurality of secondary signals from said plurality of secondary transmitter/receivers to said at least one primary transmitter/receiver;
(h) receiving said plurality of secondary signals by said at least one primary transmitter/receiver;
(i) mixing said first chirped radio frequency signal and each one of said plurality of secondary signals with said reference chirped radio frequency signal to obtain mixed first signals and a plurality of mixed second signals;
(j) filtering high frequency components from said mixed first signals and said plurality of mixed second signals by passing said mixed first signals and said plurality of mixed second signals through a low pass filter to yield a first radio frequency beat signal and a plurality of second radio frequency beat signals, respectively;
(k) digitizing said first radio frequency beat signal and said plurality of second radio frequency beat signals and obtaining therefrom first beat frequencies and a plurality of second beat frequencies;
(l) utilizing said obtained first beat frequency to evaluate a first range value from the responder to the primary transmitter/receiver and utilizing said obtained plurality of second beat frequencies to evaluate second range values from the responder to each secondary transmitter/receiver of said plurality of secondary transmitter/receivers; and
(m) processing said known position of said at least one primary—transmitter/receiver, said known positions of said plurality of secondary transmitter/receivers, said first range value and said second range values to determine the position of the movable target with respect to said fixed coordinate system.

2. The method according to claim 1, wherein said secondary signals are second chirped radio frequency signals.

3. The method according to claim 1, wherein said secondary signals are second chirped radio frequency signals and steps (g) and (h), stipulated above, are replaced by the following steps:

(i) converting said second chirped radio frequency signals in said secondary transmitter/receivers of said plurality of second transmitter/receivers into intensity modulated light signals, whereby a plurality of intensity modulated light signals is obtained;
(ii) transmitting said intensity modulated light signals from said plurality of secondary transmitter/receivers; and (iii) receiving said intensity modulated light signals by said primary transmitter/receiver and converting said received intensity modulated light signals into second chirped radio frequency signals, whereby a plurality of second chirped radio frequency signals is obtained.

4. The method according to claim 1, wherein said secondary signals are second chirped radio frequency signals and steps (g) and (h), stipulated above, are replaced, for at least one secondary transmitter/receiver of said plurality of secondary transmitter/receivers by the following steps:
(i) converting said second chirped radio frequency signals in said secondary transmitter/receivers of said plurality of second transmitter/receivers into intensity modulated light signals, whereby a plurality of intensity modulated light signals is obtained;
(ii) transmitting said intensity modulated light signals from said plurality of secondary transmitter/receivers; and
(iii) receiving said intensity modulated light signals by said primary transmitter/receiver and converting said received intensity modulated light signals into second chirped radio frequency signals, whereby a plurality of second chirped radio frequency signals is obtained.

5. The method according to claim 1, wherein said plurality of secondary transmitter/receivers comprises three secondary transmitter/receivers.

6. The method according to claim 1, wherein said plurality of secondary transmitter/receivers comprises two secondary transmitter/receivers and said primary transmitter/receiver and said two secondary transmitter/receivers are located in the XY-plane of said fixed coordinate system and the Z coordinate of said movable target does not take on negative values.

7. The method according to claim 1, wherein said plurality of secondary transmitter/receivers comprises two secondary transmitter/receivers and said primary transmitter/receiver and said two secondary transmitter/receivers are located in the XY-plane of said fixed coordinate system and the Z coordinate of said movable target does not take on positive values.

8. The method according to claim 1, wherein said second chirped radio frequency signals are transmitted from said secondary transmitter/receiver to said at least one primary transmitter/receiver by means of a radio frequency transmission unit.

9. The method according to claim 8, wherein said radio frequency transmission unit is a radio frequency transmitter connected to an antenna and said second chirped radio frequency signals are transmitted in free space.

10. The method according to claim 8, wherein said radio frequency transmission unit is a radio frequency transmitter connected to a coaxial cable through which said second chirped radio frequency signals are transmitted.

11. The method according to claim 8, wherein at least one secondary transmitter/receiver of said plurality of transmitter\receivers transmits said second chirped radio frequency signal to said at least one primary transmitter/receiver in free space by means of an antenna and the remaining secondary transmitter/receivers transmits said second chirped radio frequency signal to said at least one primary transmitter/receiver by means of a coaxial cable.

12. The method according to claim 1, wherein each intensity modulated light signal is transmitted from each secondary transmitter/receiver to said at least one primary transmitter/receiver by means of an optical transmission unit.

13. The method according to claim 12, wherein said optical transmission unit is a lens arrangement and said intensity modulated light signals are transmitted in free space.

14. The method according to claim 12, wherein said optical transmission unit is provided with a fiber optical cable through which said intensity modulated signals are transmitted.

15. The method according to claim 12, wherein at least one secondary transmitter/receiver of said plurality of transmitter/receivers transmits said intensity modulated light signals to said at least one primary transmitter/receiver in free space by means of a lens arrangement and the remaining secondary transmitter/receivers transmit said intensity modulated light signals to said at least one primary transmitter/receiver by means of a fiber optical cable.

16. The method according to claim 1, wherein said first range value, $r^{(1)}$, is obtained by solving the following equation for the first beat frequency, $F^{(1)}$:

$$F^{(1)} = 2\frac{B}{T}\frac{r^{(1)}}{C},$$

where:
B is the chirp bandwidth,
T is the chirp duration,
C is the speed of light.

17. The method according to claim 1, wherein said second range values, $r_i^{(2)}$, are obtained by solving the following equations for the second beat frequencies, $F_i^{(2)}$:

$$F_i^{(2)} = 2\frac{B}{T}\left(\frac{r^{(1)}}{C}\right),$$

where:
where $\tau_i$ is the known time delay of a signal propagating from the $i^{th}$ secondary transmitter/receiver to the primary transmitter/receiver,
i=1, . . . , N where N is the number of secondary transmitter/receivers
B is the chirp bandwidth,
T is the chirp duration,
C is the speed of light.

18. The method according to claim 1, wherein said position of the movable target with respect to said fixed coordinate system is obtained by solving four quadratic equations for the three unknown coordinates of movable target.

19. The method according to claim 18, wherein said four quadratic equations are as follows:

$$(x_2-x_1)^2+(y_2-y_1)^2+(z_2-z_1)^2=(r^{(1)})^2$$
$$(x_2-x_i)^2+(y_2-y_i)^2+(z_2-z_i)^2=(r_i^{(1)})^2 \ (i=3,4,5),$$

where
$x_1,y_1,z_1$ are the coordinates of the primary transmitter/receiver,
$x_i,y_i,z_i$ (i=3,4,5) are the coordinates of three secondary transmitter/receivers labeled 3, 4 and 5, respectively,
$x_2,y_2,z_2$ are the coordinates of the target,
$r^{(1)}$ is the distance between the target and the primary transmitter/receiver (first range value) and
$r_i^{(2)}$ (i=3,4,5) are the distances between the target and the three secondary transmitter/receivers 3, 4 and 5, respectively (second range values).

20. The method according to claim 1, wherein two of the secondary transmitter/receivers and said primary transmitter/receiver are located in the XY-plane of the coordinate system and the target is confined to move solely in the upper half space (i.e., $z_2>0$, where $z_2$ is the z coordinate of the target).

21. The method according claim 1, wherein two of the secondary transmitter/receivers and said primary transmitter/receiver are located in the XY-plane of the coordinate system and the target is confined to move solely in the lower half space (i.e., $z_2<0$, where $z_2$ is the z coordinate of the target).

22. A system for the real time determination of the position, with respect to a fixed coordinate system, of a movable target provided with a responder, said system comprising:

a primary transmitter/receiver of known position for transmitting a first intensity modulated light signal, for receiving a second intensity modulated light signal, for converting said second intensity modulated light signal into a first chirped radio frequency signal, for receiving secondary signals and for mixing said first chirped radio frequency signal and said secondary signals with a reference chirped radio frequency signal, whereby mixed signals are obtained;

a responder mounted on said target for receiving said transmitted first intensity modulated signal, for generating said second intensity modulated light signal in response to said received first intensity modulated light signal and for transmitting said second intensity modulated light signal;

a plurality of secondary transmitter/receivers of known positions for receiving said transmitted second intensity modulated light signal, for converting the received second intensity modulated light signal into a secondary signals and for transmitting said secondary signals;

low pass filters for filtering high frequency components from said mixed signals whereby first and second radio frequency beat signals are obtained;

analog-to-digital converters for digitizing said first and second radio frequency beat signals;

a processor for obtaining from said digitized first and second radio frequency beat signals, a first beat frequency and second beat frequencies, respectively, and for determining the position of the movable target with respect to said fixed coordinate system.

23. The system for the real time determination of the position of a movable target in accordance with claim 22, wherein said primary transmitter/receiver comprises:

a radio frequency chirp source for producing a chirped radio frequency signal;

a first radio frequency power splitter for splitting said chirped radio frequency signal into a reference chirped radio frequency signal and a modulating chirped radio frequency signal;

a second radio frequency power splitter for splitting said reference chirped radio frequency signal into a plurality of reference chirped radio frequency signals;

a light modulation unit to be modulated by said modulating chirped radio frequency signals to produce a first intensity modulated light signal;

a detector for detecting said second intensity modulated light signal and for converting said detected second intensity modulated light into a first chirped radio frequency signal;

receiver units for receiving said secondary signals; and a plurality of mixers for mixing said first chirped radio frequency signal and said secondary signals with said plurality of reference chirped radio frequency signals, whereby said mixed signals are obtained.

24. The system for the real time determination of the position of a movable target in accordance with claim 22, wherein said receiver units are radio frequency receivers and the secondary signals are second chirped radio frequency signals transmitted in coaxial cables.

25. The system for the real time determination of the position of a movable target in accordance with claim 23, wherein said receiver units are radio frequency receivers and the secondary signals are second chirped radio frequency signals transmitted in coaxial cables.

26. The system for the real time determination of the position of a movable target in accordance with claim 22, wherein, said receiver units are radio frequency receivers provided with antennas and said secondary signals are second chirped radio frequency signals transmitted in free space.

27. The system for the real time determination of the position of a movable target in accordance with claim 23, wherein, said receiver units are radio frequency receivers provided with antennas and said secondary signals are second chirped radio frequency signals transmitted in free space.

28. The system for the real time determination of the position of a movable target in accordance with claim 22, wherein said receiver units are detectors and amplifiers provided with fiber optical cables and said secondary signals are intensity modulated light signals transmitted in fiber optical cables.

29. The system for the real time determination of the position of a movable target in accordance with claim 23, wherein said receiver units are detectors and amplifiers provided with fiber optical cables and said secondary signals are intensity modulated light signals transmitted in fiber optical cables.

30. The system for the real time determination of the position of a movable target in accordance with claim 22, wherein, said receiver units are detectors and amplifiers and said secondary signals are intensity modulated light signals transmitted in free space.

31. The system for the real time determination of the position of a movable target in accordance with claim 23, wherein, said receiver units are detectors and amplifiers and said secondary signals are intensity modulated light signals transmitted in free space.

32. The system for the real time determination of the position of a movable target in accordance with claim 22, wherein said plurality of secondary transmitter/receivers comprises three secondary transmitter/receivers.

33. The system for the real time determination of the position of a movable target in accordance with claim 23, wherein said plurality of secondary transmitter/receivers comprises three secondary transmitter/receivers.

34. The system for the real time determination of the position of a movable target in accordance with claim 22, wherein said plurality of secondary transmitter/receivers comprises two secondary transmitter/receivers and said primary transmitter/receiver and said two secondary transmitter/receivers are located in the XY-plane of said fixed coordinate system.

35. The system for the real time determination of the position of a movable target in accordance with claim 23, wherein said plurality of secondary transmitter/receivers comprises two secondary transmitter/receivers and said primary transmitter/receiver and said two secondary transmitter/receivers are located in the XY-plane of said fixed coordinate system.

36. The system for the real time determination of the position of a movable target in accordance with claim 22, wherein a secondary transmitter/receiver of said secondary transmitter/receivers, is constructed to transmit an intensity modulated light signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal;

a light modulation unit for receiving said conditioned radio frequency signal and for transmitting an intensity modulated light signal; and an optical transmission unit for transmitting said intensity modulated light signal from said secondary transmitter/receiver.

37. The system for the real time determination of the position of a movable target in accordance with claim 23, wherein a secondary transmitter/receiver of said secondary transmitter/receivers, is constructed to transmit an intensity modulated light signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal;

a light modulation unit for receiving said conditioned radio frequency signal and for transmitting an intensity modulated light signal; and an optical transmission unit for transmitting said intensity modulated light signal from said secondary transmitter/receiver.

38. The system for the real time determination of the position of a movable target in accordance with claim 37, wherein said secondary transmitter/receiver further comprises:

a radio frequency source for providing a radio frequency signal;

a mixer for mixing said radio frequency signal with said conditioned radio frequency signal, whereby a mixed signal is obtained; and a filter for filtering said mixed signal.

39. The system for the real time determination of the position of a movable target in accordance with claim 37, wherein said filter is a low pass filter.

40. The system for the real time determination of the position of a movable target in accordance with claim 37, wherein said filter is a high pass filter.

41. The system for the real time determination of the position of a movable target in accordance with claim 22, wherein a secondary transmitter/receiver of said secondary transmitter/receivers, is constructed to transmit a chirped radio frequency signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal; and a radio frequency transmission unit for transmitting said conditioned chirped radio frequency signal from said secondary transmitter/receiver.

42. The system for the real time determination of the position of a movable target in accordance with claim 23, wherein a secondary transmitter/receiver of said secondary transmitter/receivers, is constructed to transmit a chirped radio frequency signal, said secondary transmitter/receiver comprising:

an optical receiver unit comprising an optical detector and appropriate optics, for receiving an incident intensity modulated light signal and for transmitting a chirped radio frequency signal;

a radio frequency conditioning unit for conditioning said chirped radio frequency signal thereby yielding a conditioned chirped radio frequency signal; and a radio frequency transmission unit for transmitting said conditioned chirped radio frequency signal from said secondary transmitter/receiver.

43. The system for the real time determination of the position of a movable target in accordance with claim 41, wherein said secondary transmitter/receiver further comprises:

a radio frequency source for providing a radio frequency signal;

a mixer for mixing said radio frequency signal with said conditioned radio frequency signal, whereby a mixed signal is obtained; and a filter for filtering said mixed signal.

44. The system for the real time determination of the position of a movable target in accordance with claim 37, wherein said filter is a low pass filter.

45. The system for the real time determination of the position of a movable target in accordance with claim 37, wherein said filter is a high pass filter.

* * * * *